(12) United States Patent
Croak et al.

(10) Patent No.: US 8,654,670 B2
(45) Date of Patent: Feb. 18, 2014

(54) METHOD AND APPARATUS FOR DETERMINING A DIRECT MEASURE OF QUALITY IN A PACKET-SWITCHED NETWORK

(71) Applicant: AT&T Intellectual Property II, L.P., Atlanta, GA (US)

(72) Inventors: Marian Croak, Fair Haven, NJ (US); Hossein Eslambolchi, San Diego, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

(21) Appl. No.: 13/707,419

(22) Filed: Dec. 6, 2012

(65) Prior Publication Data

US 2013/0100843 A1    Apr. 25, 2013

Related U.S. Application Data

(63) Continuation of application No. 11/019,848, filed on Dec. 22, 2004, now Pat. No. 8,369,230.

(51) Int. Cl.
*G08C 15/00* (2006.01)

(52) U.S. Cl.
USPC .................................................. 370/252

(58) Field of Classification Search
None
See application file for complete search history.

(56) References Cited

U.S. PATENT DOCUMENTS

| | | |
|---|---|---|
| 6,198,262 B1 | 3/2001 | Squibb et al. |
| 6,498,778 B1 | 12/2002 | Cwilich et al. |
| 6,542,499 B1 | 4/2003 | Murphy et al. |
| 7,391,731 B1 | 6/2008 | Skelly et al. |
| 2001/0055370 A1 | 12/2001 | Kommer |
| 2002/0154646 A1 | 10/2002 | Dubois et al. |
| 2002/0167937 A1 | 11/2002 | Goodman |
| 2004/0167731 A1 | 8/2004 | Wang et al. |
| 2005/0128943 A1 | 6/2005 | Gibbs et al. |

*Primary Examiner* — Jianye Wu

(57) ABSTRACT

A method and system for analyzing deficiencies in a packet-switched network is described. In one example, network measurement data pertaining to components within a packet-switched network are obtained. Reliability estimates of access networks and associated access links coupled to the packet-switch network are conducted. Lastly, an end-to-end direct measure of quality (DMOQ) is calculated from the network measurement data and network estimation data derived from the reliability estimates.

18 Claims, 3 Drawing Sheets

METHOD AND APPARATUS FOR DETERMINING A DIRECT MEASURE OF QUALITY IN A PACKET-SWITCHED NETWORK

This application is a continuation of U.S. patent application Ser. No. 11/019,848, filed Dec. 22, 2004, now U.S. Pat. No. 8,369,230, which is herein incorporated by reference in its entirety.

BACKGROUND OF THE INVENTION

1. Field of the Invention

Embodiments of the present invention generally relate to communication networks and, more particularly, to a method and apparatus for determining a direct measure of quality in a packet-switched network, e.g., a Voice over Internet Protocol (VoIP) network.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet-switched networks and circuit-switched networks. Exemplary packet-switched networks include internet protocol (IP) networks, asynchronous transfer mode (ATM) networks, frame-relay networks, and the like. An exemplary circuit-switched network includes a plain old telephone system (POTS), such as the publicly switched telephone network (PSTN). Although circuit-switched networks have traditionally been used to provide an effective means for voice communication, packet-switched networks are currently being utilized on a more frequent basis. Another example of packet-switched networks is a Voice over Internet Telephony (VoIP) network.

Providers of these types of networks may set "direct measures of quality" (DMOQs) to gauge the reliability and quality of the services their networks offer. For example, a network provider may establish DMOQs capable of measuring call setup rates and the service availability of a network. These DMOQs are typically influenced by a number of factors. Network component defects, human error, access deficiencies, and transport disruptions are examples of considerations that contribute toward the reduction of a DMOQ. Although most factors that contribute to DMOQs can be directly measured and controlled, other determinants, such as components associated with access networks, are beyond the direct visibility of a particular network provider and make the determination of a DMOQ problematic.

Accordingly, there exists a need in the art for a method and apparatus for determining an end-to-end DMOQ in a reliable and efficient manner.

SUMMARY OF THE INVENTION

In one embodiment, a method and system for analyzing deficiencies in a packet-switched network is described. More specifically, network measurement data pertaining to components within a packet-switched network are obtained. Reliability estimates of access networks and associated access links coupled to the packet-switch network are conducted. Lastly, an end-to-end direct measure of quality (DMOQ) is calculated from the network measurement data and network estimation data derived from the reliability estimates.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
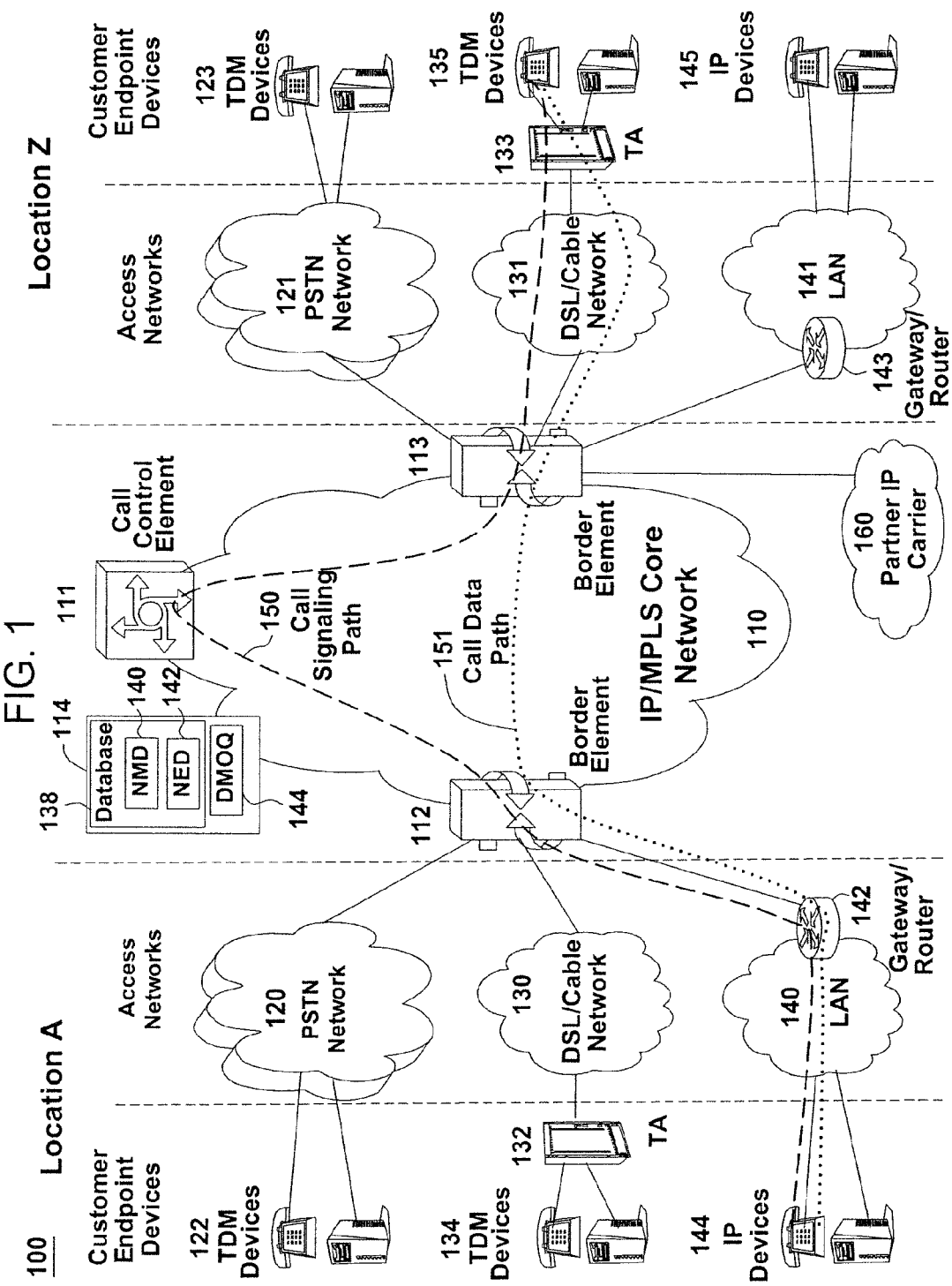
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 114, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 111. BE 111 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 111 and BE 113 so that the call data exchange can proceed directly between BE 111 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 111 and 113 are responsible for the necessary signaling protocol translation, e.g., SS7 to and from SIP, and media format conversion, such as TDM voice format to and from IP based packet voice format.

The VoIP related server 114, which is coupled to the packet-switched network 110, may be any type of computer or device that stores data, manages network resources, and performs other conventional computing functions. Depending on the particular embodiment, there may be one or more VoIP related servers coupled to the network 110. The server 114 may also contain a database 138. The database may be an electronic filing system or any collection of information organized in such a way that the server 114 can quickly select desired pieces of data. In one embodiment, the database 138 may store network measurement data 140 obtained by the DMOQ module 144, which also resides on the server 114. The network measurement data 140 constitutes a portion of the requisite information needed to ultimately create a DMOQ. The network measurement data 140 may comprise information relating to various performance aspects of the network components (e.g., border elements 112) that may be derived or obtained directly from the network 110. In one embodiment, the network measurement data 140 may comprise fit rates, failover characteristics, redundancy, and power source reliability indexes (e.g., mean time to failure (MTTF)) of the network components.

More specifically, the fit rate of a network component may represent the degree of reliability that the component will be compatible with the network 110. The failover characteristics describe the ability of a network component to cooperate and provide a backup functionality. For example, a plurality of network components may communicate with one another to facilitate failovers such that when software or hardware become inoperative on a particular network component, another component can quickly execute the same function as the inoperative component without significant interruption. As such, a user of services that are supported by the inoperative component would not be substantially impacted by an inoperative server or software. Whereas the failover characteristics describe a component's effectiveness to back up another component in the network, redundancy may relate to the actual number of backup components. More specifically, the greater the number of redundant components existing in a network directly correlates to the number of possible paths a network can use to handle or route a given call flow.

In addition to component properties and characteristics, the network measurement data may also include other information obtained directly from the network. In one embodiment, this data may come from call flow tracing information obtained by a VoIP related server (e.g., a signaling tracer server (STS)), Call Detail Records (CDRs), and the like. A CDR is data associated with a telephone call, including the calling and the called numbers, the date and timestamp, the duration, the call setup delay, the final handling code, along with other performance related data, such as packet loss and delay of the telephone call. The final handling code is the code that indicates whether a call has been completed successfully, blocked or cut off.

Likewise, the database 138 may store the requisite network estimation data 142 ultimately needed to determine a DMOQ. In one embodiment, the network estimation data 142 comprises performance data pertaining to access network and associated network access links that may be involved in particular service provided by the network provider. For example, if a DMOQ was desired for call flow reliability, the component reliability characteristics of the access networks and access network elements through which the "end-to-end" call signaling flow and call media travels during a particular call flow would be required. However, the complete end-to-end signaling path (as well as the entire media path) may include other components that are positioned outside the core VoIP network 110. For instance, the call flow may have to traverse another cable provider's broadband network via connecting access links (see FIG. 1). Since an end-to-end DMOQ is dependent on core VoIP network components, access networks, and various access links, the "unknown" contribution made by the access networks and access must ultimately be estimated.

To obtain this type of information, data collecting "probes" may have to be deployed by the network provider in order to gauge the overall service quality and reliability of any relevant access network (e.g., DSL/cable network 131). These probes may include time stamped requests in order to measure an access network's tendency to exhibit jitter or test scripts used to measure an access network's reliability (i.e., transmitting an "x" number of test script packets and determining if "x" packets return) and call capacity. Likewise, the access links associated with an access network would be included in the network estimation data.

For example, the access links which connect the core VoIP network 110 to the calling and receiving endpoint devices (and intervening access networks), should be assessed. Notably, the estimated performance characteristics of the access links connecting the VoIP network 110 with the access network would constitute a portion of the network estimation data. Characteristics of the access links, such as signal degeneration qualities, bandwidth capacity, susceptibility to interference, and the like are useful in determining estimates of the contributions made by the network access links associated with the access networks toward the overall reliability of a particular service provided by the network provider. In one embodiment, this access link information is similarly obtained by network probes deployed by the network provider and provided to the server 114.

Figure 2:
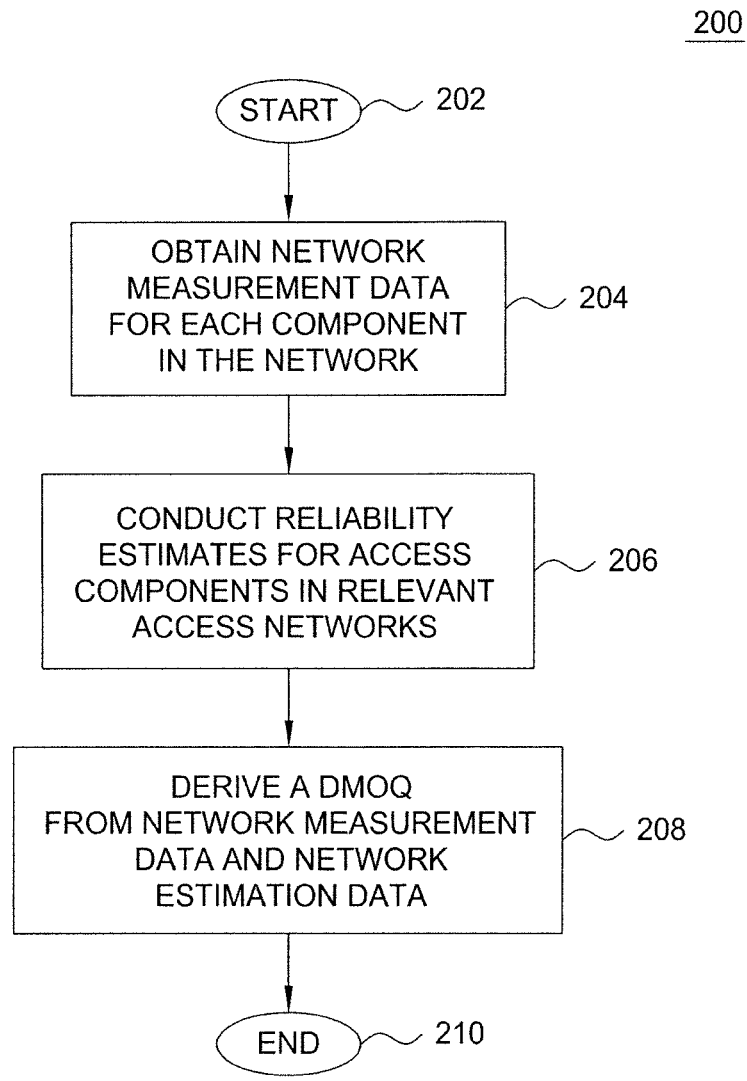
FIG. 2 is a flow diagram depicting an exemplary embodiment of a method for determining an end-to-end direct measure of quality in a packet-switched network in accordance with the invention.

FIG. 2 is a flow diagram depicting an exemplary embodiment of a method 200 method for determining a direct measure of quality (DMOQ) for a provided service in a packet-switched network in accordance with the invention. Aspects of the method 200 may be understood with reference to the VoIP network of FIG. 1.

The method 200 begins at step 202. At step 204, network measurement data 140 is obtained. In one embodiment, this data may be directly obtained from a server 114. Specifically, the server 114 obtains this data directly from the network components that may be utilized to provide the particular service. This data is acquired over a predetermined period of time. For example, the data may include recently obtained data or alternatively, data that has been acquired over a long time period, and is subsequently stored in a database 138 for later use. In the event a DMOQ must be calculated, the DMOQ module 144 obtains the requisite network measurement data from the database. In another embodiment, the server 114 obtains the network measurement data directly from the network 110 for immediate processing. As discussed above, the network measurement data may include component fit rates, component failover characteristics, CDRs, call flow tracing information, and the like. Essentially, the network measurement data 140 may comprise any type of data that can be directly obtained from the core VoIP network 110 and can be used to determine the DMOQ of a service offered by a network provider.

The method 200 then continues to step 206, where network estimate data 142 is acquired. In one embodiment, the network estimate data 142 is obtained by deploying probes capable of estimating various aspects of access network components and access networks that can be used to assess the reliability and quality of service of a particular access network and associated access links. The probes may accomplish this by acquiring measurements of data packet loss, jitter exhibited, and the like. Essentially, the network measurement data 140 may comprise any type of data pertaining to the access networks or associated network access links that contribute to the overall reliability and/or quality of a particular service offered by a network provider and cannot be directly obtained from the core VoIP network 110.

At step 208, a DMOQ for the particular network service is derived from the network measurement data and the network estimation data. In one embodiment, the DMOQ module 144 processes the network measurement data and network estimation data obtained and stored by the server 114. More specifically, the DMOQ module 144 computes the exact contribution of the known VoIP network components using the network measurement data relevant to the network service in question (e.g., a component's contribution toward call flow service reliability if a DMOQ for call flow reliability is required). Similarly, the DMOQ module 144 conducts reliability estimates for each of the access networks and associated access links that are utilized to provide the particular network service. After performing these computations, the DMOQ produces a DMOQ that measures the reliability (and/or quality) of the particular service. The method 200 proceeds to step 210 and ends.

Figure 3:
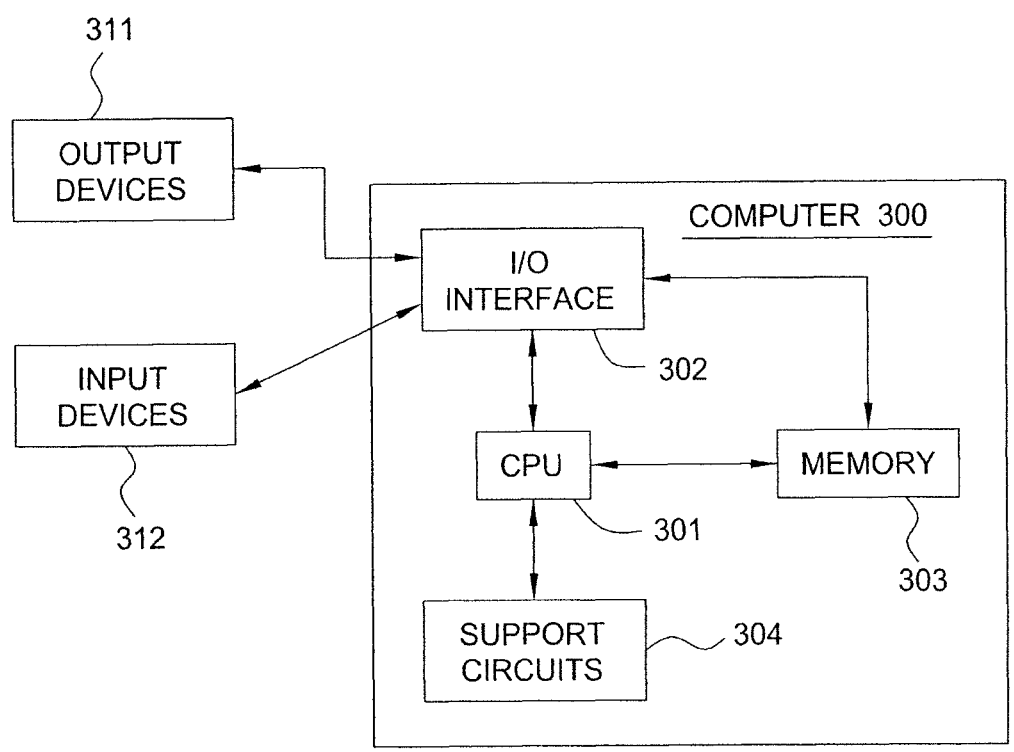
FIG. 3 is a block diagram depicting an exemplary embodiment of a computer suitable for implementing the processes and methods described herein.

FIG. 3 is a block diagram depicting an exemplary embodiment of a computer 300 suitable for implementing the processes and methods described herein. For example, the computer 300 may be used to implement the call control element 111, border elements 112, 113, and the like of FIG. 1. The computer 300 includes a central processing unit (CPU) 301, a memory 303, various support circuits 304, and an I/O interface 302. The CPU 301 may be any type of microprocessor known in the art. The support circuits 304 for the CPU 301 include conventional cache, power supplies, clock circuits, data registers, I/O interfaces, and the like. The I/O interface 302 may be directly coupled to the memory 303 or coupled through the CPU 301. The I/O interface 302 may be coupled to various input devices 312 and output devices 311, such as a conventional keyboard, mouse, printer, display, and the like.

The memory 303 may store all or portions of one or more programs and/or data to implement the processes and methods described herein. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 300 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 303. The memory 303 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media (e.g., computer readable media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method for determining an end-to-end measure of quality for a service provided in a packet-switched network, comprising:
   obtaining, by a server, network measurement data for network components within the packet-switched network utilized to provide the service;
   acquiring, by the server, network estimation data for an access network and an access link outside of the packet-switched network, wherein the network estimation data is directly obtained by network probes sent from the packet-switched network, wherein the network probes comprise time stamped requests used to measure a tendency of the access network to exhibit jitter and to estimate characteristics of the access links including a bandwidth capacity; and
   calculating, by the server, the end-to-end measure of quality for the service from the network measurement data and the network estimation data, wherein the calculating comprises:
      conducting reliability estimates for the access network and the access link utilizing the network estimation data; and
      processing the network measurement data and the reliability estimates to derive the end-to-end measure of quality.

2. The method of claim 1, wherein the network measurement data comprises a mean time to failure of a component power supply.

3. The method of claim 1, wherein the network probes comprise test scripts utilized to measure the access network.

4. The method of claim 1, wherein the packet-switched network comprises an internet protocol network.

5. The method of claim 1, wherein the packet-switched network comprises a voice over internet protocol network.

6. The method of claim 1, wherein the network measurement data comprises network component failover characteristics.

7. An apparatus for determining an end-to-end measure of for a service provided in a packet-switched network, comprising:
   a server comprising a processor; and
   a computer-readable medium storing a plurality of instructions which, when executed by the processor, cause the processor to perform operations, the operations comprising:
      obtaining network measurement data for network components within the packet-switched network utilized to provide the service;
      acquiring network estimation data for an access network and an access link outside of the packet-switched network, wherein the network estimation data is directly obtained by network probes sent from the packet-switched network, wherein the network probes comprise time stamped requests used to measure a tendency of the access network to exhibit jitter and to estimate characteristics of the access links including a bandwidth capacity; and
      calculating the end-to-end measure of quality for the service from the network measurement data and the network estimation data, by:
         conducting reliability estimates for the access network and the access link utilizing the network estimation data; and
         processing the network measurement data and the reliability estimates to derive the end-to-end measure of quality.

8. The apparatus of claim 7, wherein the network measurement data comprises a mean time to failure of a component power supply.

9. The apparatus of claim 7, wherein the network probes comprise test scripts utilized to measure the access network.

10. The apparatus of claim 7, wherein the packet-switched network comprises an internet protocol network.

11. The apparatus of claim 7, wherein the packet-switched network comprises a voice over Internet protocol network.

12. The apparatus of claim 7, wherein the network measurement data comprises network component failover characteristics.

13. A non-transitory computer readable medium storing instructions which, when executed by a processor of a server, cause the processor to perform operations for determining an end-to-end measure of quality for a service provided in a packet-switched network operated, the operations comprising:
   obtaining network measurement data for network components within the packet-switched network utilized to provide the service;
   acquiring network estimation data for an access network and an access link outside of the packet-switched network, wherein the network estimation data is directly obtained by network probes sent from the packet-switched network, wherein the network probes comprise time stamped requests used to measure a tendency of the access network to exhibit jitter and to estimate characteristics of the access links including a bandwidth capacity; and
   calculating the end-to-end measure of quality for the service from the network measurement data and the network estimation data, wherein the calculating comprises:
      conducting reliability estimates for the access network and the access link utilizing the network estimation data; and
      processing the network measurement data and the reliability estimates to derive the end-to-end measure of quality.

14. The non-transitory computer readable medium of claim 13, wherein the network measurement data comprises a mean time to failure of a component power supply.

15. The non-transitory computer readable medium of claim 13, wherein the network probes comprise test scripts utilized to measure the access network.

16. The non-transitory computer readable medium of claim 13, wherein the packet-switched network comprises an internet protocol network.

17. The non-transitory computer readable medium of claim 13, wherein the internet protocol network comprises a voice over internet protocol network.

18. The non-transitory computer readable medium of claim 13, wherein the network measurement data comprises network component failover characteristics.

* * * * *